United States Patent
Narita

(10) Patent No.: US 10,764,500 B2
(45) Date of Patent: Sep. 1, 2020

(54) IMAGE BLUR CORRECTION DEVICE AND CONTROL METHOD

(71) Applicant: CANON KABUSHIKI KAISHA, Tokyo (JP)

(72) Inventor: Yu Narita, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 3 days.

(21) Appl. No.: 16/138,230

(22) Filed: Sep. 21, 2018

(65) Prior Publication Data

US 2019/0098215 A1 Mar. 28, 2019

(30) Foreign Application Priority Data

Sep. 26, 2017 (JP) ................. 2017-184615

(51) Int. Cl.
*H04N 5/232* (2006.01)
*G06T 7/50* (2017.01)
*G06T 7/246* (2017.01)

(52) U.S. Cl.
CPC ......... *H04N 5/23287* (2013.01); *G06T 7/248* (2017.01); *G06T 7/50* (2017.01); *H04N 5/23254* (2013.01); *H04N 5/23258* (2013.01); *H04N 5/23245* (2013.01)

(58) Field of Classification Search
CPC ........... H04N 5/23251; H04N 5/23254; H04N 5/23261; H04N 5/23264; H04N 5/2328–23287; G06T 7/246–251; G05T 7/50; G05T 7/55–596

See application file for complete search history.

(56) References Cited

U.S. PATENT DOCUMENTS

| 2015/0103145 A1* | 4/2015 | Sakata | H04N 5/23229 348/46 |
| 2019/0045126 A1* | 2/2019 | Takeuchi | H04N 19/513 |
| 2019/0045127 A1* | 2/2019 | Takeuchi | H04N 19/139 |

FOREIGN PATENT DOCUMENTS

JP 2016-119572 A 6/2016

* cited by examiner

*Primary Examiner* — Paul M Berardesca
(74) *Attorney, Agent, or Firm* — Cowan, Liebowitz & Latman, P.C.

(57) ABSTRACT

An image blur correction device tracks a feature point in a captured image, calculates feature point tracking information, and estimates a positional relationship including a depth between a subject and an imaging apparatus as three-dimensional coordinates of the feature point on the basis of the feature point tracking information and position attitude information of the imaging apparatus calculated on the basis of shake information relating to shake of the imaging apparatus. The image blur correction device also controls a degree of contribution of the feature point to the estimation of the three-dimensional coordinates. The image blur correction device corrects the position attitude information according to a result of the estimation of the three-dimensional coordinates of the feature point, calculates a target position of a shake correction lens based on the shake information and the position attitude information, and drives the shake correction lens.

11 Claims, 16 Drawing Sheets

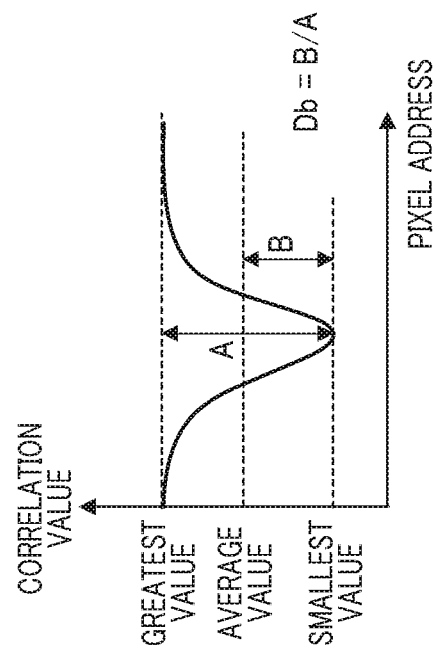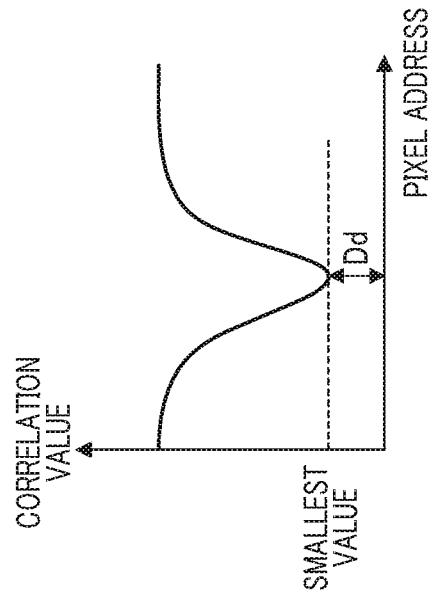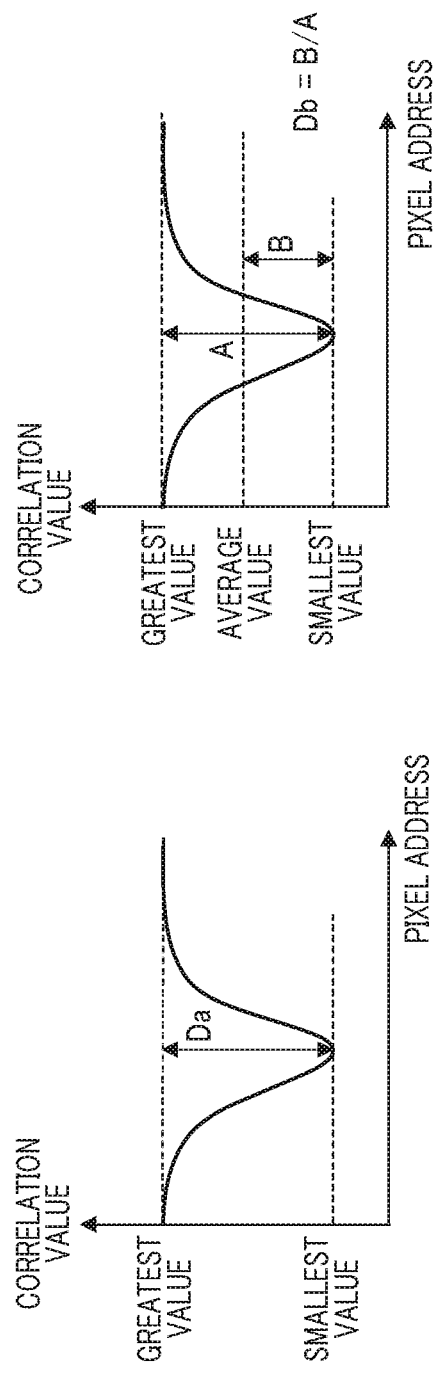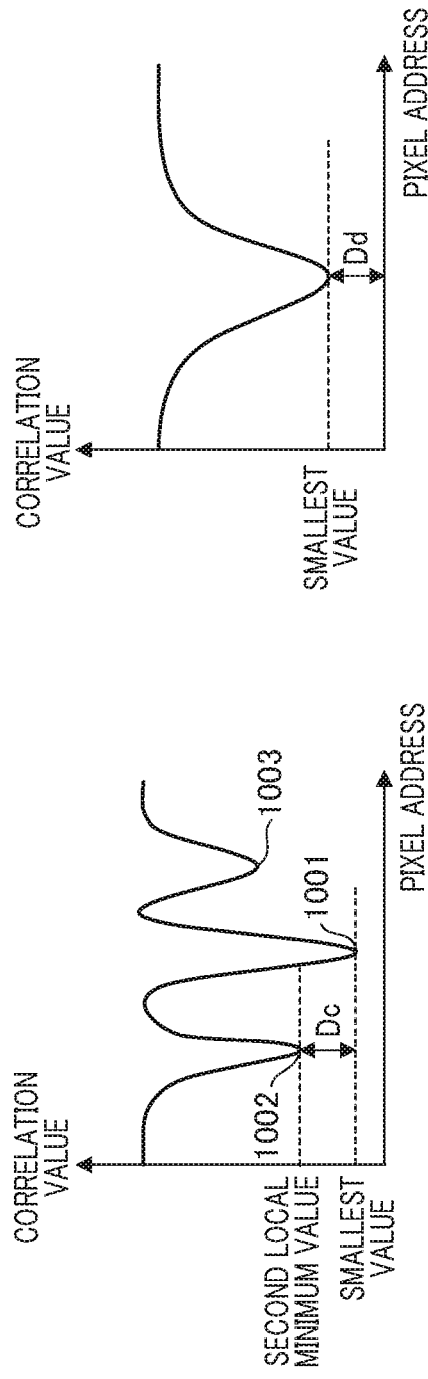

IMAGE BLUR CORRECTION DEVICE AND CONTROL METHOD

BACKGROUND OF THE INVENTION

Field of the Invention

The present invention relates to an image blur correction device and a control method.

Description of the Related Art

When an image of a subject is captured by an imaging apparatus such as a digital camera, shake (image blur) may occur in the image of the subject due to "camera shake" or the like of a user holding the body of the camera. An imaging apparatus having an image blur corrector that corrects such image blur has been proposed. Image blur correction processes include an optical image blur correction process and an electronic image blur correction process. In the optical image blur correction process, shake applied to the body of the camera is detected using an angular velocity sensor or the like and a correction lens provided in an imaging optical system is moved according to the detection result. The image blur is corrected by changing the direction of the optical axis of the imaging optical system and moving an image formed on a light receiving surface of an imaging element. In the electronic image blur correction process, image blur is corrected in a pseudo manner through image processing of the captured image.

To correct image blur caused by camera shake, it is necessary to detect a change in the position and attitude of the imaging apparatus. A technology in which known SFM and visual and inertial sensor fusion techniques are applied to estimate 3-dimensional coordinates of an object present in a real space and the position attitude of the imaging apparatus is known as a self-position estimation method for detecting the position attitude of the imaging apparatus. SFM stands for "structure from motion." The visual and inertial sensor fusion technique is a technique relating to position attitude estimation using inertial sensors. Japanese Patent Laid-Open No. 2016-119572 discloses a technology for correcting image blur using the result of tracking of movement of feature points.

However, three-dimensional coordinate estimation of an object using SFM may fail if the parallax amount between images is small. The technology disclosed in Japanese Patent Laid-Open No. 2016-119572 avoids a reduction in the parallax amount by selecting images to be tracked such that the parallax amount between the images is increased. However, when the parallax amount between images is small, it is not possible to perform processing in which the small parallax amount is reflected. This causes occurrence of periods during which no processing is performed and occurrence of periods during which no control is performed with respect to image blur correction. Particularly, if image blur occurs for a long period due to fine camera shake, the image blur cannot be corrected with the technology disclosed in Japanese Patent Laid-Open No. 2016-119572.

SUMMARY OF THE INVENTION

The present invention provides an image blur correction device which can perform image blur correction with high accuracy using three-dimensional coordinates of feature points.

An image blur correction device according to an embodiment of the present invention includes a feature point tracker configured to track a feature point in a captured image and to calculate coordinate information of the feature point as feature point tracking information, a three-dimensional coordinate estimator configured to estimate a positional relationship including a depth between a subject and an imaging apparatus as three-dimensional coordinates of the feature point on the basis of the feature point tracking information and position attitude information of the imaging apparatus calculated on the basis of shake information relating to shake applied to the imaging apparatus, a controller configured to control a degree of contribution of the feature point to the estimation of the three-dimensional coordinates, a corrector configured to correct the position attitude information of the imaging apparatus according to a result of the estimation of the three-dimensional coordinates of the feature point, a target position calculator configured to calculate a target position of a shake corrector used to correct image blur caused by shake applied to the imaging apparatus based on the shake information and the position attitude information, and a driver configured to drive the shake corrector according to the target position.

According to the image blur correction device of the present invention, it is possible to perform image blur correction with high accuracy using three-dimensional coordinates of feature points.

Further features of the present invention will become apparent from the following description of exemplary embodiments (with reference to the attached drawings).

BRIEF DESCRIPTION OF THE DRAWINGS

FIGS. 10A to 10D are diagrams illustrating exemplary indices of the correlation value representing tracking reliability.

DESCRIPTION OF THE EMBODIMENTS

Figure 1:
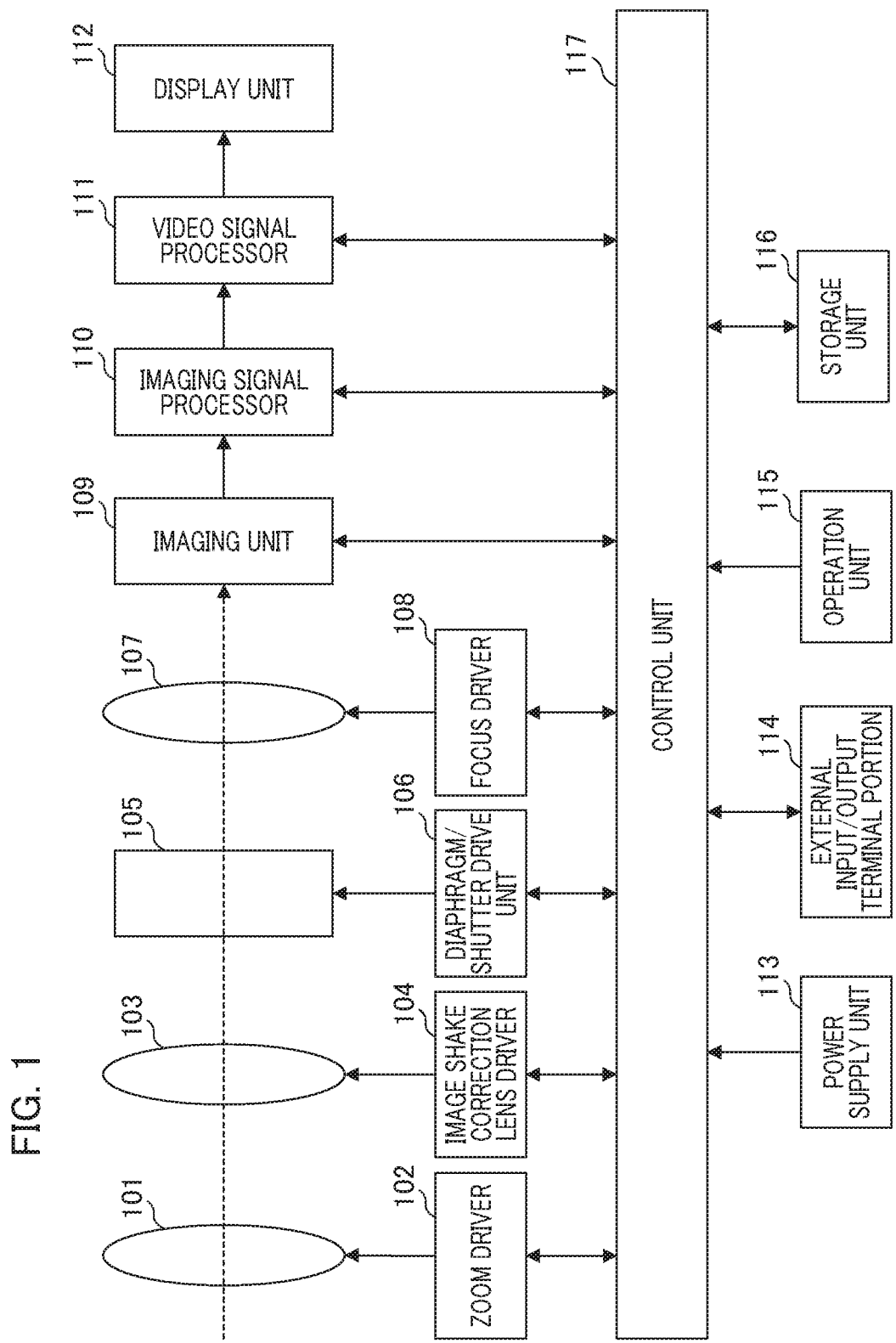
FIG. 1 is a diagram illustrating an exemplary configuration of an imaging apparatus.
Figure 2:
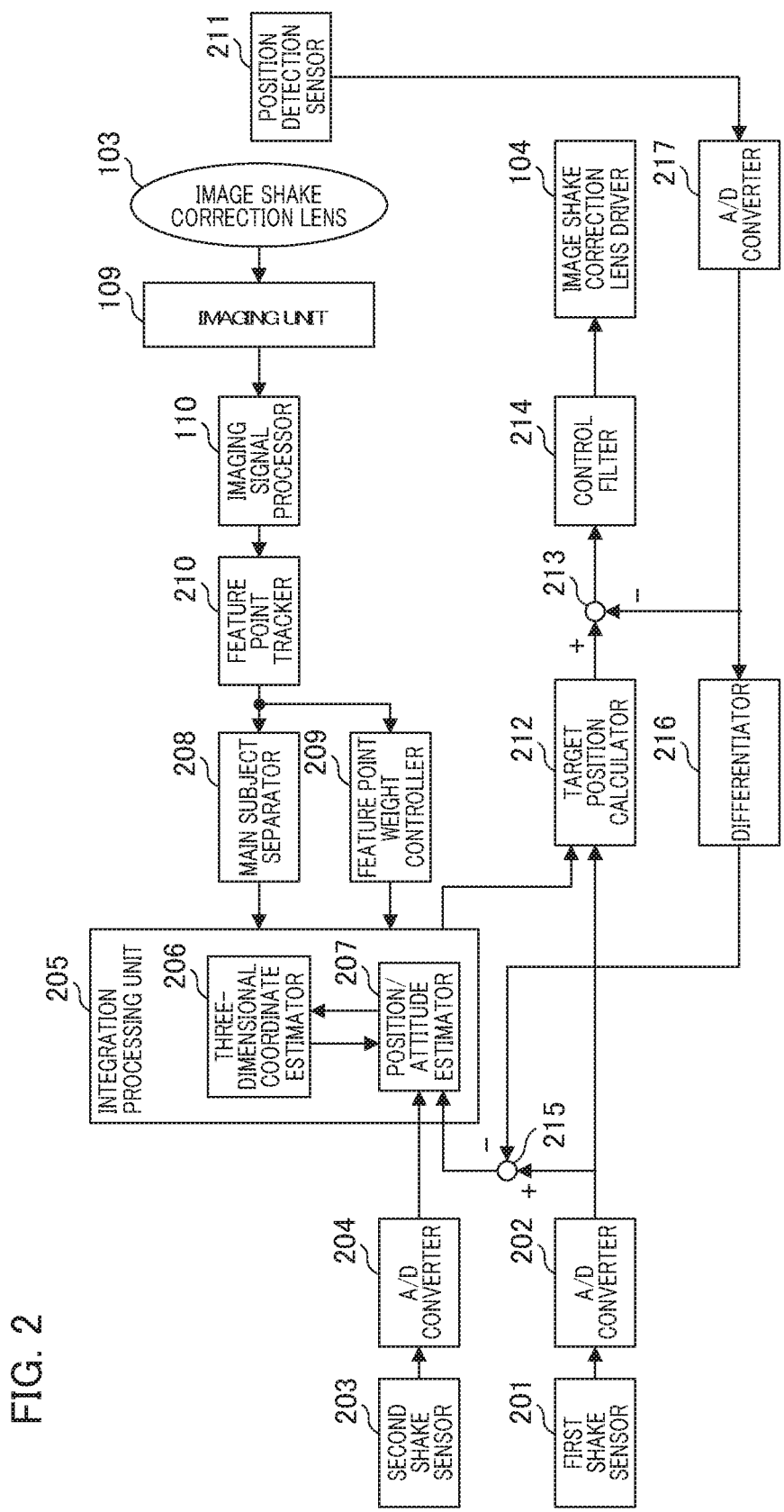
FIG. 2 is a diagram illustrating an exemplary configuration of an image blur correction device.

FIG. 1 is a diagram illustrating an exemplary configuration of an imaging apparatus according to the present embodiment. FIG. 2 is a diagram illustrating an exemplary configuration of an image blur correction device included in the imaging apparatus. The present invention can be applied not only to imaging apparatuses such as video cameras, digital cameras, and silver salt still cameras but also to optical apparatuses including observation devices such as binoculars, telescopes, and field scopes. The present invention can also be applied to optical apparatuses such as an interchangeable lens for digital single lens reflex. Hereinafter, an operation of correcting image blur using a shake detection signal from an imaging apparatus is referred to as an "image blur correction operation."

The imaging apparatus shown in FIG. 1 is, for example, a digital still camera. It is to be noted that the imaging apparatus may have a moving image capture function. The imaging apparatus includes a zoom unit 101. The zoom unit 101 is a part of a magnification-variable imaging lens which is a constituent element of an imaging optical system and which includes a zoom lens for changing photographing magnification. A zoom driver 102 drives the zoom unit 101 according to a control signal from a control unit 117.

An image blur correction lens 103 is a correction member (a shake corrector) used to correct image blur caused by shake applied to the imaging apparatus. The image blur correction lens 103 is movable in a direction perpendicular to the direction of the optical axis of the imaging lens. An image blur correction lens driver 104 drives the image blur correction lens 103 under the control of the control unit 117. A diaphragm/shutter unit 105 has a mechanical shutter having a diaphragm function. A diaphragm/shutter drive unit 106 drives the diaphragm/shutter unit 105 according to a control signal from the control unit 117. A focus lens 107 used for focus adjustment is a part of the imaging lens and can change in position along the optical axis of the imaging lens. A focus driver 108 drives the focus lens 107 according to a control signal from the control unit 117.

An imaging unit 109 converts an optical image formed by the imaging optical system into an electric signal in units of pixels using an imaging element such as a CCD image sensor or a CMOS image sensor. CCD stands for "charge coupled device." CMOS stands for "complementary metal-oxide."

An imaging signal processor 110 performs analog/digital (A/D) conversion, correlated double sampling, gamma correction, white balance correction, color interpolation processing, or the like on the electric signal output by the imaging unit 109 to convert it into a video signal. A video signal processor 111 processes the video signal output by the imaging signal processor 110 according to application. Specifically, the video signal processor 111 generates video data for display and performs data file conversion or encoding processing for recording. A display unit 112 displays an image as necessary on the basis of the video signal for display output by the video signal processor 111.

A power supply unit 113 supplies power to the entire imaging apparatus according to application. An external input/output terminal portion 114 is used to receive and output a communication signal and a video signal from and to an external device. An operation unit 115 includes buttons, switches, and the like for a user to issue instructions to the imaging apparatus. A storage unit 116 stores various data including video information or the like.

The control unit 117 has, for example, a CPU, a ROM, and a RAM, and controls the entire imaging apparatus. CPU stands for "central processing unit." ROM stands for "read only memory." RAM stands for "random access memory." A control program stored in the ROM is developed on the RAM and executed by the CPU to control each part of the imaging apparatus, thereby realizing operations of the imaging apparatus including various operations that will be described below.

The operation unit 115 has a release switch configured such that a first switch (referred to as SW1) and a second switch (referred to as SW2) are sequentially turned on in accordance with the amount of pressing of the release button. The SW1 is turned on when the release button is pressed halfway and the SW2 is turned on when the release button is pressed fully.

When the SW1 is turned on, the control unit 117 calculates an auto focus (AF) evaluation value on the basis of the video signal for display that the video signal processor 11 outputs to the display unit 112. Then, the control unit 117 controls the focus driver 108 on the basis of the AF evaluation value to perform automatic focus detection and focus adjustment control. In addition, on the basis of brightness information of the video signal and a predetermined program chart, the control unit 117 performs automatic exposure (AE) processing for determining an aperture value and a shutter speed for obtaining an appropriate amount of exposure.

When the SW2 is turned on, the control unit 117 performs imaging with the determined aperture and shutter speed, and controls each processing unit such that image data obtained by the imaging unit 109 is stored in the storage unit 116. Further, the operation unit 115 has an operation switch used to select an image blur correction (anti-shake) mode. When the image blur correction mode is selected by operating this operation switch, the control unit 117 instructs the image blur correction lens driver 104 to perform an image blur correction operation. Upon receiving a control instruction from the control unit 117, the image blur correction lens driver 104 performs the image blur correction operation until an image blur correction OFF instruction is issued.

The operation unit 115 also has a capture mode selection switch that enables selection of one of a still image capture mode and a moving image capture mode. A capture mode selection process is performed by the user's operation of the capture mode selection switch, and the control unit 117 changes the operation condition of the image blur correction lens driver 104. The image blur correction lens driver 104 realizes an image blur correction device of the present embodiment. Further, the operation unit 115 has a reproduction mode selection switch for selecting a reproduction mode. When the reproduction mode is selected by the user's operation of the reproduction mode selection switch, the control unit 117 performs control to stop the image blur correction operation. The operation unit 115 also has a magnification change switch for issuing an instruction to change zoom magnification. When an instruction to change the zoom magnification is issued by the user's operation of the magnification change switch, the zoom driver 102, which has received the instruction through the control unit 117, drives the zoom unit 101 to move the zoom lens to the instructed zoom position.

FIG. 2 is a diagram illustrating an exemplary configuration of the image blur correction device according to the present embodiment. The image blur correction device corrects image blur caused by shake applied to the imaging apparatus by driving the image blur correction lens 103. A first shake sensor 201 is, for example, an angular velocity sensor and detects shake of the imaging apparatus in a vertical direction (pitch direction), a horizontal direction (yaw direction), and a rotation direction around the optical axis (roll direction) when the imaging apparatus is in a normal attitude (an attitude in which the longitudinal direction of a captured image substantially coincides with the horizontal direction).

A second shake sensor 203 is, for example, an acceleration sensor and detects the amount of vertical movement, the amount of horizontal movement, and the amount of movement in the direction of the optical axis of the imaging apparatus when the imaging apparatus is in a normal attitude, that is, when it is in an attitude in which the longitudinal direction of a captured image substantially coincides with the horizontal direction.

A feature point tracker 210 extracts and tracks feature points in a video signal input from the imaging signal processor 110, that is, a signal relating to the captured image. The feature point tracker 210 calculates coordinate information of each feature point as feature point tracking information. The feature point tracker 210 also calculates the reliability of feature point tracking information (hereinafter referred to as tracking reliability). A main subject separator 208 separates feature points belonging to the region of a main subject and feature points belonging to a background region other than the main subject from each other among the feature points tracked by the feature point tracker 210.

A feature point weight controller 209 controls a feature point weight indicating the degree of contribution of each feature point in the captured image to three-dimensional coordinate estimation of the feature point that is performed by a three-dimensional coordinate estimator 206 which will be described later. An integration processing unit 205 has the three-dimensional coordinate estimator 206 and a position attitude estimator 207. The integration processing unit 205 integrates outputs of the first shake sensor 201 and the second shake sensor 203 (inertial sensor information) with outputs of the main subject separator 208 and the feature point weight controller 209 and estimates the position attitude of the imaging apparatus and three-dimensional coordinates of the feature points.

A position detection sensor 211 outputs positional information of the image blur correction lens 103 in the pitch and yaw directions. The positional information is provided to a control filter 214 through an adder/subtractor 213. On the basis of the output of the integration processing unit 205 and a shake detection signal (a shake angular velocity) relating to shake in the pitch and yaw directions of the imaging apparatus from the first shake sensor 201, a target position calculator 212 generates a target position control signal for driving the image blur correction lens 103 in the pitch and yaw directions. The target position control signal is provided to the control filter 214 through the adder/subtractor 213.

The control filter 214 acquires the target position control signal from the target position calculator 212 and the positional information of the image blur correction lens 103 from the position detection sensor 211 and performs feedback control. Thus, the control filter 214 controls the image blur correction lens driver 104, which is an actuator, such that a position detection signal value from the position detection sensor 211 converges to a target position control signal value from the target position calculator 212. The image blur correction lens driver 104 drives the image blur correction lens 103 in accordance with the target position control signal value from the target position calculator 212. A/D converters 202, 204 and 217 convert analog values detected by the first shake sensor 201, the second shake sensor 203, and the position detection sensor 211 into digital values.

Figure 3:
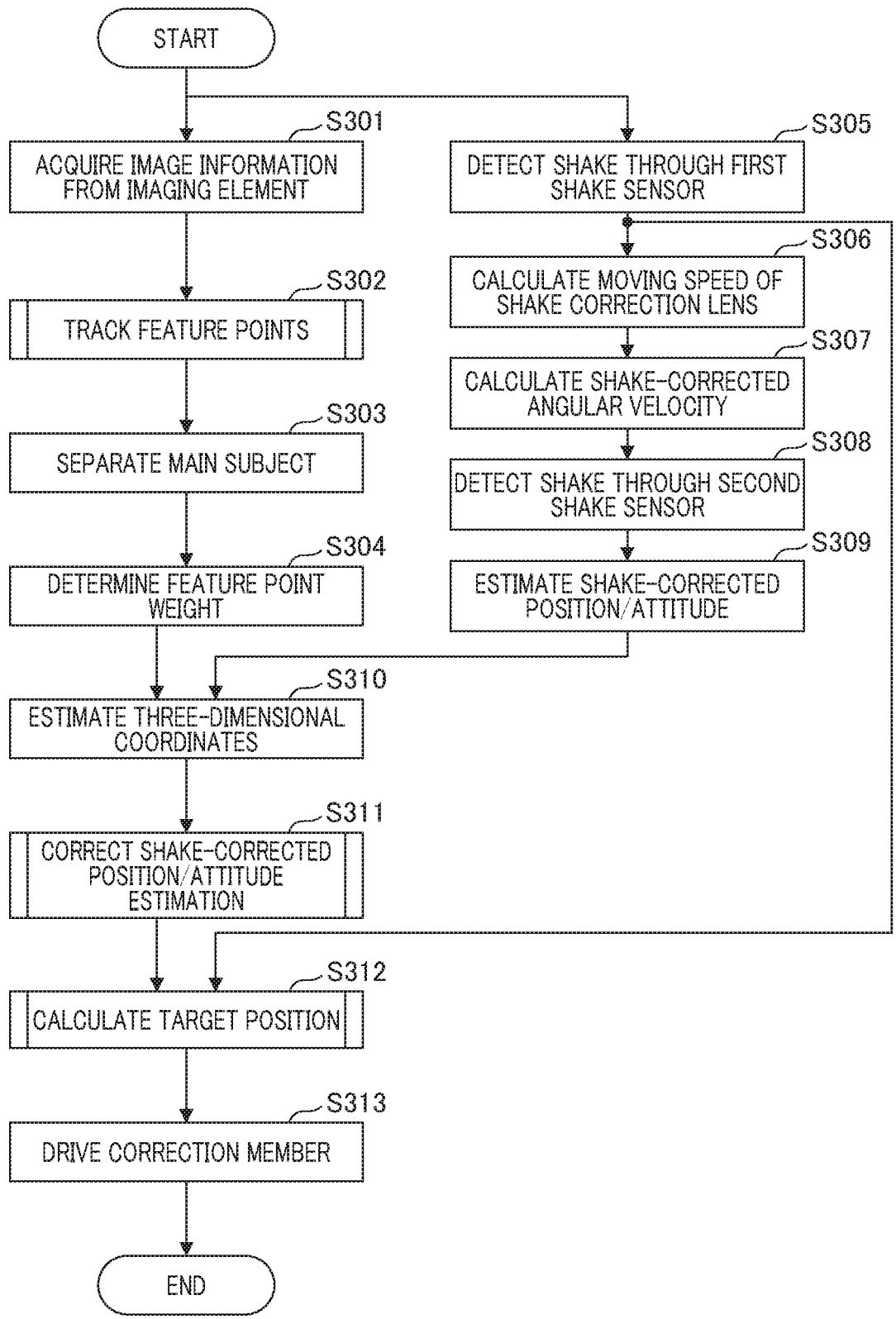
FIG. 3 is a diagram illustrating an operation process of the image blur correction device.

FIG. 3 is a diagram illustrating an operation process of the image blur correction device of the present embodiment. In step S301, the imaging unit 109 converts an optical signal into an electric signal through the imaging element. Thereby, an image signal relating to a captured image is acquired. In step S302, the imaging signal processor 110 converts the image signal from analog to digital and performs predetermined image processing. Then, the feature point tracker 210 tracks feature points in the image and calculates tracking reliabilities thereof. Details of feature point tracking will be described later.

Next, in step S303, the main subject separator 208 separates feature points belonging to the region of a main subject and feature points belonging to a background region other than the main subject from each other among the feature points tracked in step S302. For example, clustering using a known K-means method or EM algorithm is used for the separation of feature points. Subsequently, in step S304, the feature point weight controller 209 controls a feature point weight indicating the degree of contribution (the contribution degree) of each feature point to three-dimensional coordinate estimation that is performed by the three-dimensional coordinate estimator 206. The method of controlling feature point weights will be described later.

In steps S305 to S309, position attitude estimation processing of the imaging apparatus is performed in parallel with the processing of steps S301 to S304. First, in step S305, the first shake sensor 201 detects a shake angular velocity as shake information applied to the imaging apparatus. In step S306, a differentiator 216 calculates a difference between captured frames of the image blur correction lens 103 to calculate the moving speed of the image blur correction lens 103.

In step S307, the position attitude estimator 207 calculates a shake-corrected angular velocity of the imaging apparatus by subtracting the moving speed of the image blur correction lens 103 from the shake angular velocity output by the first shake sensor 201. In step S308, the second shake sensor 203 which is, for example, an acceleration sensor detects the amount of movement of the imaging apparatus. In step S309, the position attitude estimator 207 estimates the position attitude of the imaging apparatus in a real space on the basis of both the shake-corrected angular velocity calculated in step S307 and the amount of movement of the imaging apparatus detected in step S308, and outputs a position attitude estimation value (position attitude information). Since the position/attitude of the imaging apparatus is estimated using the shake-corrected angular velocity, the position attitude thereof corresponds to a shake-corrected position attitude obtained through image blur correction.

In step S310, the three-dimensional coordinate estimator 206 performs the following processing on the basis of the position attitude estimation value output in step S309 and information on the feature points in the background region having the feature point weights determined in step S304. The three-dimensional coordinate estimator 206 estimates a positional relationship including the depth between the subject and the imaging apparatus thereof as three-dimensional coordinates of the feature points. Details of the three-dimensional coordinate estimation processing will be described later.

In step S311, the position attitude estimator 207 corrects the position attitude estimation value according to the result of estimation of the three-dimensional coordinates of the feature points. Specifically, the position attitude estimator 207 corrects the position attitude estimation value obtained in step S309 on the basis of the three-dimensional coordinates of the feature points estimated in step S310 and two-dimensional coordinates of feature points of the background region obtained in step S303. The corrected position attitude estimation value is output as a shake-corrected angle signal. Details of correction of the position attitude estimation value will be described later.

Next, in step S312, the target position calculator 212 generates a target position control signal for driving the image blur correction lens 103 in the pitch and yaw directions on the basis of the shake angular velocity detected in step S305 and the position attitude estimation value corrected in step S311. Details of the target position calculation will be described later. In step S313, the image blur correction lens driver 104 drives the image blur correction lens 103 on the basis of the target position calculated in step S312. Details of the processing of the feature point tracker 210 in step S302 of FIG. 3 will be described below.

<Details of Feature Point Tracking>

Figure 4:
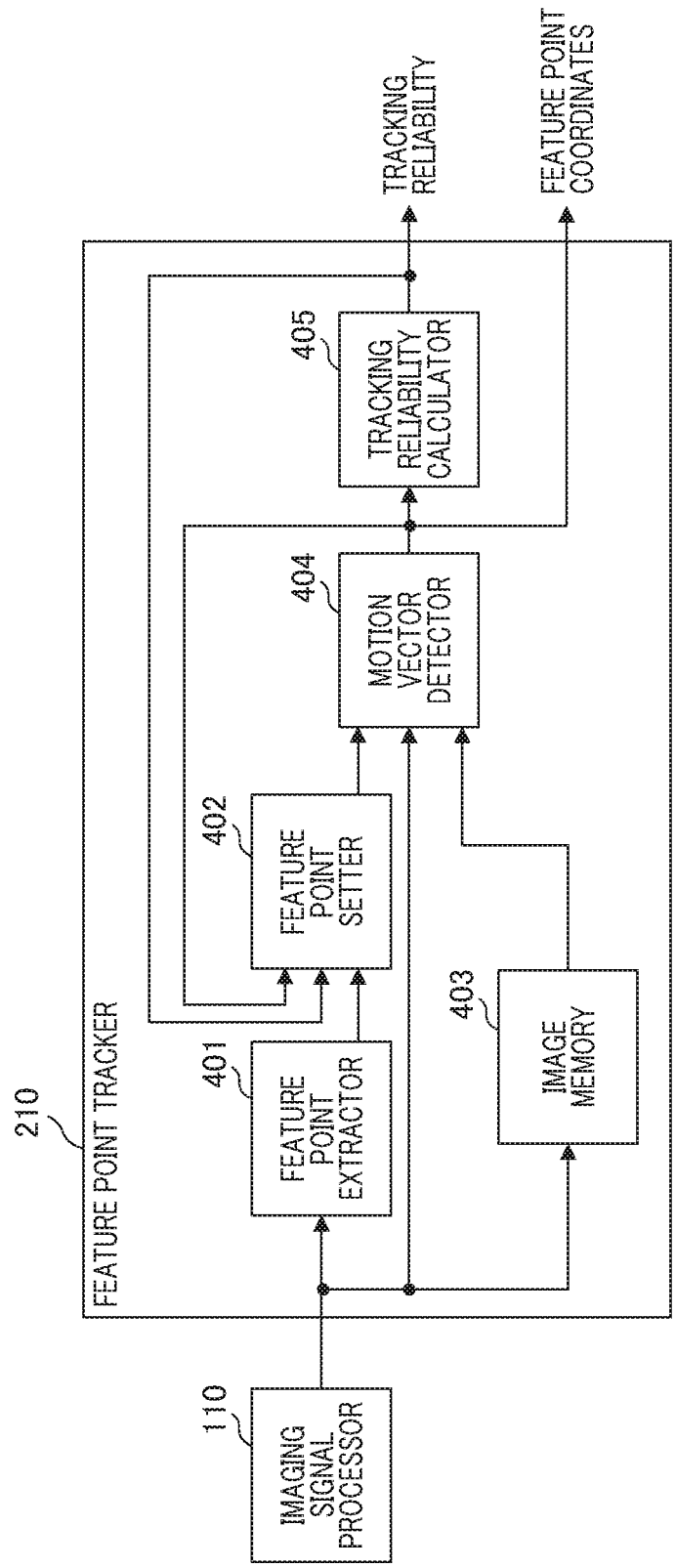
FIG. 4 is a diagram illustrating an exemplary configuration of a feature point tracker.

FIG. 4 is a diagram showing an exemplary configuration of the feature point tracker. The feature point tracker 210 includes a feature point extractor 401, a feature point setter 402, an image memory 403, a motion vector detector 404, and a tracking reliability calculator 405. The feature point extractor 401 extracts feature points from a captured image. The feature point setter 402 sets a feature point to be tracked. The image memory 403 temporarily stores an image input from the imaging signal processor 110. On the basis of the feature point set by the feature point setter 402, the motion vector detector 404 detects motion vectors for images input from the imaging signal processor 110 and the image memory 403. That is, the motion vector detector 404 functions as a vector calculator that calculates motion vector information on the basis of a signal relating to the captured image. The tracking reliability calculator 405 calculates tracking reliabilities.

Figure 5:
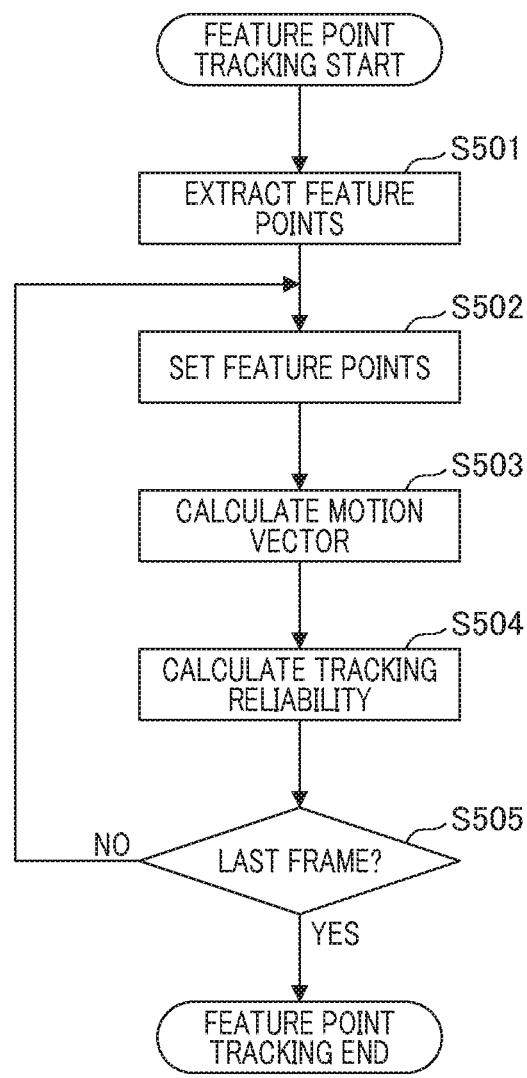
FIG. 5 is a flowchart illustrating an exemplary operation process of the feature point tracker.

FIG. 5 is a flowchart illustrating an exemplary operation process of the feature point tracker. In step S501, the feature point extractor 401 extracts feature points from the input image from the imaging signal processor 110.

Figure 6A:
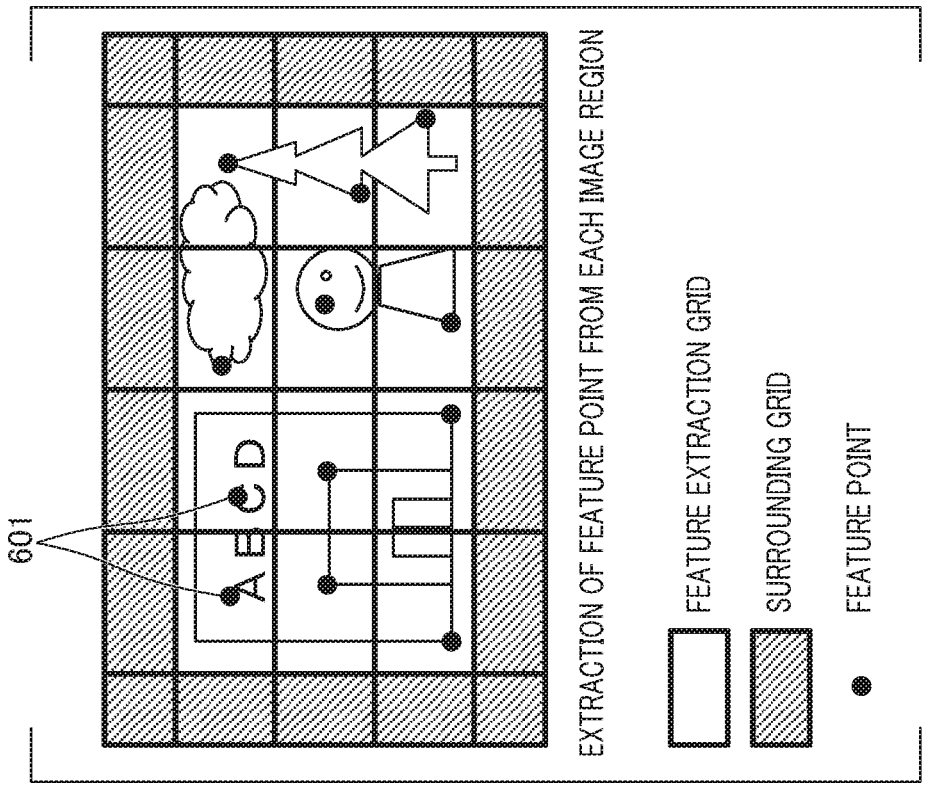
FIGS. 6A and 6B are diagrams illustrating an example of feature point extraction.
Figure 6B:
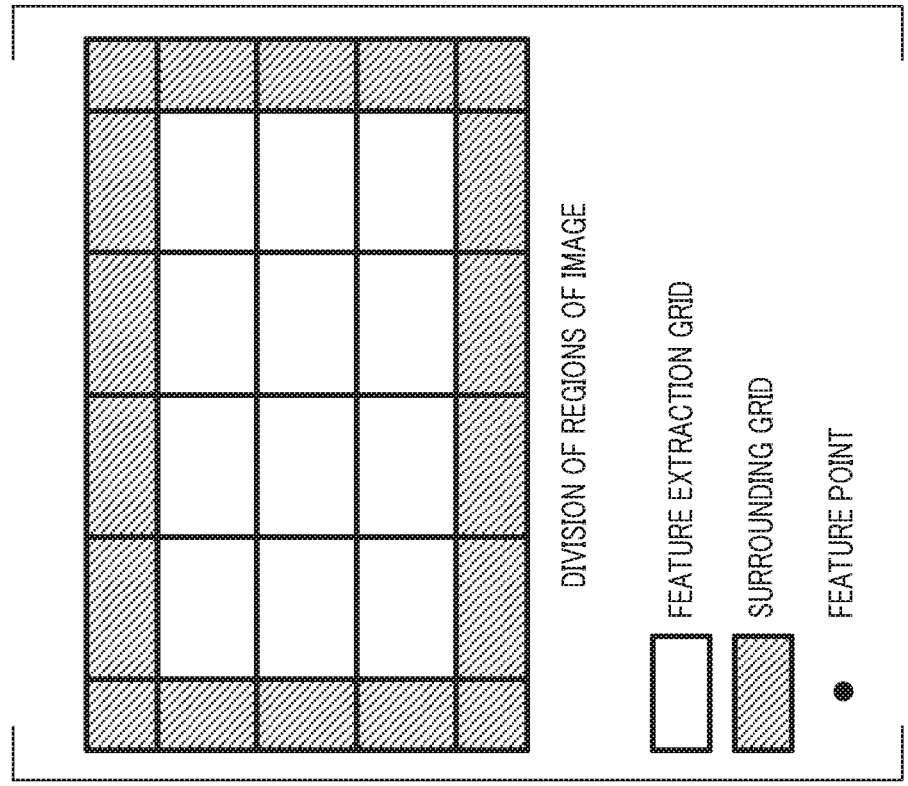

FIGS. 6A and 6B are diagrams illustrating an example of feature point extraction. For example, as shown in FIGS. 6A and 6B, the feature point extractor 401 extracts a predetermined number of feature points for each of a plurality of divided image regions. In FIG. 6A, a white rectangular region is a feature extraction region for performing feature point extraction. A hatched peripheral region is defined around the feature extraction region. Depending on the position of an extracted feature point, a template region and a search region used to detect a motion vector, which will be described later, protrude from the feature extraction region. Therefore, a hatched surrounding region is defined as a surplus image region corresponding to the protrusion. FIG. 6B shows a process for extracting one feature point 601 for each of image regions divided in a grid form.

A generally known method may be applied as a method of extracting feature points. For example, a Harris corner detector or the Shi and Tomasi method is applied. In the Harris corner detector or the Shi and Tomasi method, a brightness value at a pixel (x, y) of an image is expressed as I(x, y). Then, an autocorrelation matrix H expressed by Equation (1) is created from results Ix and Iy of application of horizontal and vertical first-order differential filters to the image.

$$H = G * \begin{pmatrix} Ix^2 & IxIy \\ IxIy & Iy^2 \end{pmatrix} \quad (1)$$

In Equation (1), G represents smoothing by a Gaussian distribution shown in Equation (2).

$$G(x, y) = \frac{1}{2\pi\sigma^2} \exp\left(-\frac{x^2 + y^2}{2\sigma^2}\right) \quad (2)$$

The Harris detector extracts a pixel having a great feature amount as a feature point using a feature evaluation formula shown in Equation (3).

$$\text{Harris}=\det(H)-\alpha(tr(H))^2 (\alpha=0.04\sim0.15) \quad (3)$$

In Equation (3), "det" represents a determinant and "tr" represents the sum of diagonal elements. "α" is a constant which was experimentally found to have a desirable value of 0.04 to 0.15.

On the other hand, the Shi and Tomasi method uses a feature evaluation equation shown in Equation (4).

$$\text{Shi and Tomasi}=\min(\lambda 1, \lambda 2) \quad (4)$$

Equation (4) represents that the smaller of eigenvalues λ1 and λ2 of the autocorrelation matrix H in Equation (1) is taken as a feature amount. Also when the Shi and Tomasi method is used, a pixel having a great feature amount is extracted as a feature point. The feature amount of the pixel is calculated by Equation (3) or Equation (4), and a predetermined number of pixels counted in decreasing order of feature amount are extracted as a feature point.

Description will now return to the description of FIG. 5. In step S502, the feature point setter 402 sets a feature point which is a tracking target. In the case of an initial frame, a feature point newly extracted in step S501 may be set as a tracking target.

In step S503, the motion vector detector 404 detects a motion vector using the feature point set as the tracking target in step S502. A known method such as a correlation method or a block matching method is applied as a method of detecting the motion vector. Any known method can be applied as a method of calculating the motion vector. An exemplary application of the block matching method will be described below.

Figure 7A:
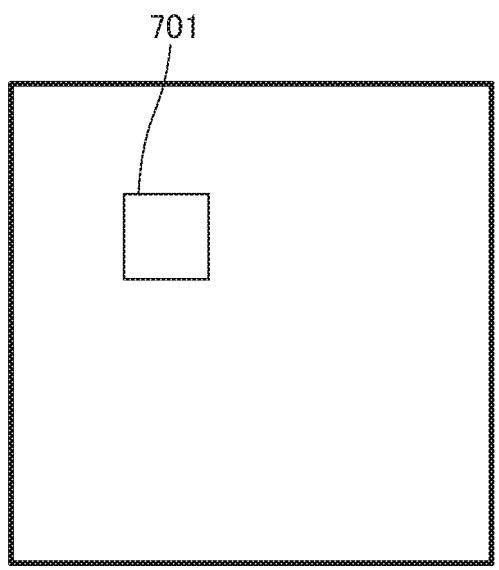
FIGS. 7A and 7B are diagrams illustrating an exemplary application of a block matching method.
Figure 7B:
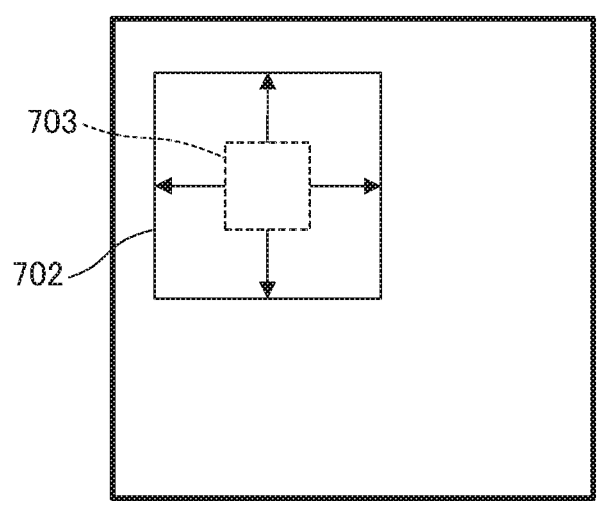

FIGS. 7A and 7B are diagrams illustrating an exemplary application of the block matching method. FIGS. 7A and 7B show a reference image and a target image which are two images for vector detection. In this example, a motion vector from the past frame image to the current frame image is calculated using a frame image held in the image memory 403 as the reference image and image data directly input from the imaging signal processor 110 as the target image. It is to be noted that the reference image and the target image may be interchangeably applied. Interchanged application of the reference image and the target image means to calculate a motion vector from the current frame image to the past frame image.

The motion vector detector 404 arranges a template region 701 in the reference image and a search region 702 in the target image and calculates a correlation value between the template region 701 and the search region 702. The template region 701 may be arranged around the feature point set in step S502 of FIG. 5 and the search region may be arranged with a predetermined size such that the search region includes the template region equally in its top, bottom, left and right portions.

In the present embodiment, the sum of absolute differences (hereinafter abbreviated as SAD) is used as a method of calculating the correlation value. A calculation formula of SAD is shown in Equation (5).

$$S\_SAD = \Sigma_i \Sigma_j |f(i,j) - g(i,j)| \quad (5)$$

In Equation (5), "f(i, j)" represents a brightness value at coordinates (i, j) in the template region 701. "g(i, j)" represents a brightness value at each pair of coordinates in a region 703 for correlation value calculation within the search region 702 (hereinafter referred to as a correlation value calculation region). In SAD, the absolute differences between brightness values "f(i, j)" and "g(i, j)" in the two regions 701 and 703 are calculated and the sum of the absolute differences is calculated to obtain a correlation value S_SAD. A smaller correlation value S_SAD indicates a higher degree of similarity of texture between the template region 701 and the correlation value calculation region 703. It is to be noted that a method other than SAD may be used to calculate the correlation value. For example, the sum of squared differences (SSD) or normalized cross-correlation (NCC) may be used.

The motion vector detector 404 calculates the correlation value while moving the correlation value calculation region 703 over the entire search region 702. As a result, for example, a correlation value map shown in FIGS. 8A and 8B is created for the search region 702.

Figure 8B:
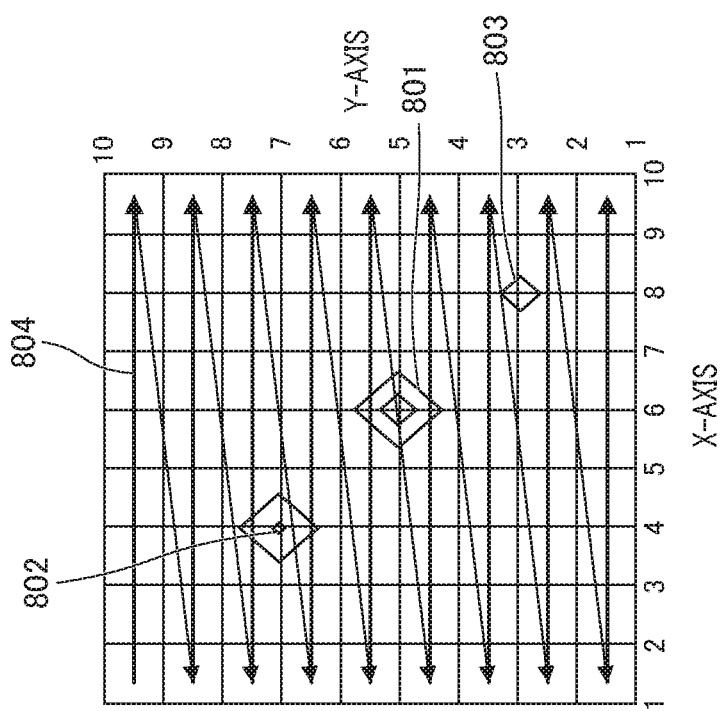
FIGS. 8A and 8B are diagrams illustrating an exemplary correlation value map.
Figure 8A:
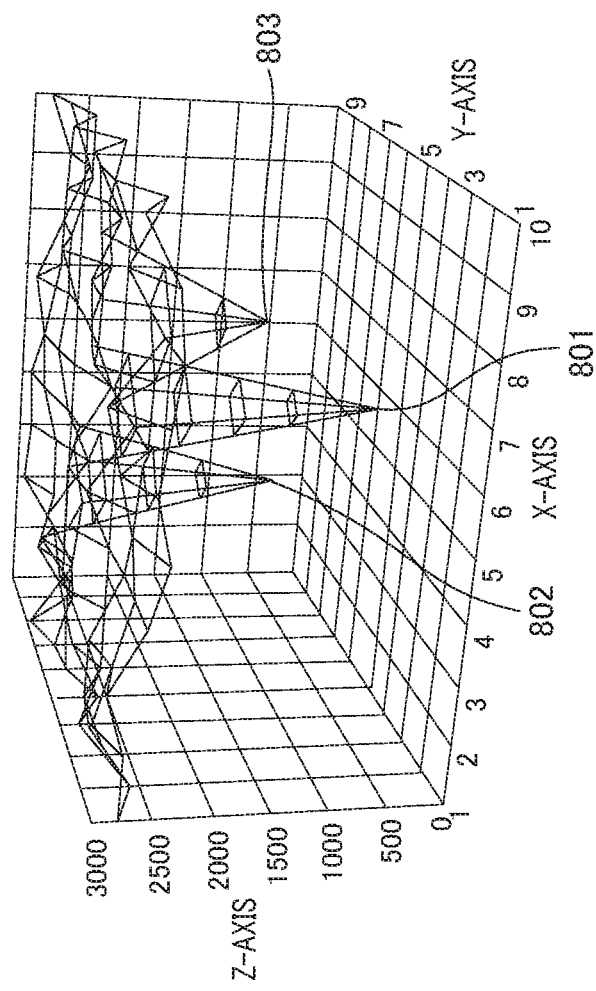

FIGS. 8A and 8B are diagrams showing an exemplary correlation value map. FIG. 8A shows a correlation value map calculated in the coordinate system of the search region 702. The X axis and the Y axis represent the coordinates of the correlation value map and the Z axis represents the magnitude of the correlation value at each pair of coordinates. FIG. 8B shows contour lines of FIG. 8A.

In FIGS. 8A and 8B, the smallest correlation value is a local minimum value 801 and it can be determined that a region where the local minimum value 801 is calculated within the search region 702 has texture very similar to that of the template region 701. A local minimum value 802 is the second local minimum value and a local minimum value 803 is the third local minimum value. Regions where the local minimum values 802 and 803 are calculated have texture similar to that of the template region 701 with the highest texture similarities after the region where the local minimum value 801 is calculated. In this way, the motion vector detector 404 calculates the correlation value between the template region 701 and the search region 702 and determines a position of the correlation value calculation region 703 where the correlation value is the smallest. As a result, the motion vector detector 404 specifies a movement destination position on the target image to which the template region 701 on the reference image is to be moved. Then, the motion vector detector 404 detects a motion vector whose direction and magnitude correspond to a direction from the position of the template region on the reference image to the movement destination position on the target image and the amount of the movement, respectively.

Description will now return to the description of FIG. 5. In step S504, the tracking reliability calculator 405 calculates the tracking reliability using at least one of feature point information obtained in step S501 and correlation value information obtained in step S503. The correlation value information is a result of calculation of the correlation value performed when calculating the motion vector information.

Figure 9:
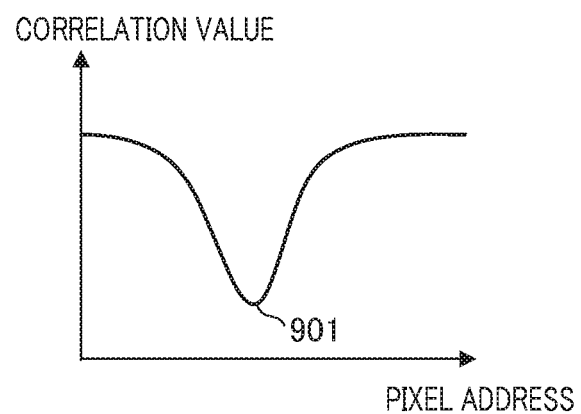
FIG. 9 is a diagram illustrating a relationship between a correlation value and a pixel address.
Figure 11A:
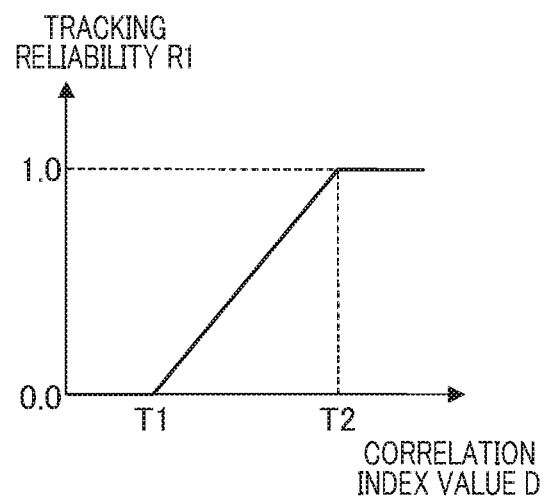
FIGS. 11A and 11B are diagrams illustrating exemplary correlations between indices of the correlation value and the tracking reliability.
Figure 11B:
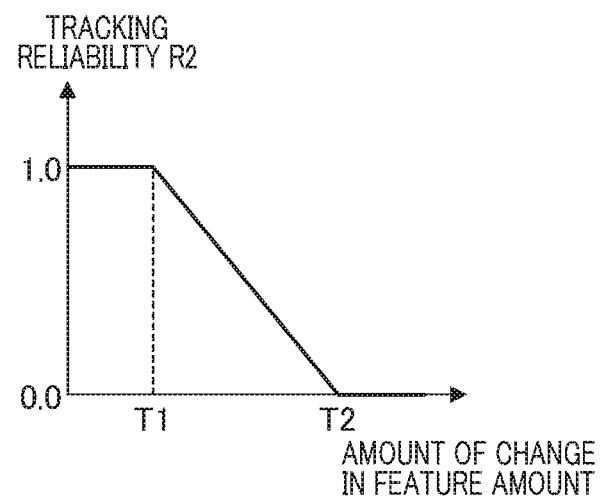

FIG. 9 is a diagram showing a relationship between a correlation value and a pixel address. FIGS. 10A to 10D are diagrams showing exemplary indices of the correlation value representing the tracking reliability. FIGS. 11A and 11B are diagrams showing exemplary correlations between the indices of the correlation value and the tracking reliability.

An example of calculation of the tracking reliability using correlation value information will be described below with reference to FIGS. 9 to 11A. A graph shown in FIG. 9 expresses the correlation value in one dimension by arranging the correlation value in a raster order as denoted by "804" in the two-dimensional correlation value map of FIG. 8B. The vertical axis in FIG. 9 represents the correlation value. The horizontal axis represents a pixel address uniquely determined by X and Y coordinates in the correlation value map. Hereinafter, the expression of FIG. 9 will be used to calculate the tracking reliability. It is to be noted that a position 901 corresponds to the first local minimum value in FIGS. 8A and 8B.

In the example shown in FIG. 10A, the difference Da between the smallest and the greatest of the correlation value is used as an index. Da represents the range of the correlation value map. If Da is small, the contrast of texture is considered to be low, indicating that the tracking reliability is low. In the example shown in FIG. 10B, the ratio Db (=B/A) of the difference A between the smallest and the greatest of the correlation value and the difference B between the smallest and the average thereof is used as an index. Db represents the steepness of the peak correlation value. If Db is small, the similarity between the template region and the search region is considered to be low, indicating that the tracking reliability is low.

In the example shown in FIG. 10C, the difference Dc between the first local minimum value and the second local minimum value of the correlation value is used as an index. Correlation values 1001, 1002, and 1003 correspond to the local minimum values 801, 802, and 803 of FIGS. 8A and 8B, respectively. Dc represents the periodicity of the correlation value map. If Dc is small, the texture is considered to have a repetitive pattern, edge, or the like, indicating that the tracking reliability is low. In this example, the first local minimum value and the second local minimum value are selected. However, other local minimum values may also be selected since it suffices to determine the periodicity of the correlation value map.

In the example shown in FIG. 10D, the smallest value Dd of the correlation value is used as an index. If Dd is great, the similarity between the template region and the search region is considered to be low, indicating that the tracking reliability is low. Since Dd and the tracking reliability are inversely proportional to each other, the reciprocal (1/Dd) of Dd is used as an index. The indices of the correlation value described above can each be used directly as the tracking reliability.

In addition, association between the correlation value index and the tracking reliability may be performed as shown in FIG. 11A. The horizontal axis in FIG. 11A represents the correlation value index (any one of Da, Db, Dc, and 1/Dd). The vertical axis represents the tracking reliability. In FIG. 11A, two threshold values T1 and T2 are provided such that the tracking reliability is 0 if the correlation value index is equal to or less than T1 and 1 if it is equal to or greater than T2. The threshold values may be changed for each of the correlation value indices. Further, in a section between the threshold values T1 and T2, the correlation value index and the tracking reliability may be associated with each other nonlinearly. In the following description, tracking reliabilities obtained from the correlation value indices are expressed as Ra, Rb, Rc, and Rd. The tracking reliabilities and the correlation value indices have a relationship of Ra=f(Da), Rb=f(Db), Rc=f(Dc), and Rd=f (Dd). A final tracking reliability R1 may be calculated by combining Ra, Rb, Rc, and Rd. Combination methods using weighted summation and logical operation will be described below.

In a combination method using weighted summation, the tracking reliability R1 is calculated as shown in Equation (6) when weights for Ra, Rb, Rc, and Rd are Wa, Wb, Wc, and Wd, respectively.

$$R1 = Wa \times Ra + Wb \times Rb + Wc \times Rc + Wd \times Rd \quad (6)$$

For example, the weights are Wa=0.4, Wb=0.3, Wc=0.2, and Wd=0.1. When all tracking reliabilities are sufficiently high and Ra=Rb=Rc=Rd=1, it is obtained from Equation (6) that R1=1.0. Also, when Ra=0.6, Rb=0.5, Rc=0.7, and Rd=0.7, it is obtained from Equation (6) that R1=0.6.

In a combination method using logical operation, the tracking reliability R1 is calculated, for example, using logical multiplication as shown in Equation (7) when thresholds for Ra, Rb, Rc, and Rd are Ta, Tb, Tc, and Td, respectively.

$$R1 = (Ra \geq Ta) \wedge (Rb \geq Tb) \wedge (Rc \geq Tc) \wedge (Rd \geq Td) \quad (7)$$

where "$\wedge$" is a symbol representing logical multiplication

If Ra≥Ta, Rb≥Tb, Rc≥Tc, and Rd≥Td are all satisfied, R1=1 (high reliability), otherwise R1=0 (low reliability).

Alternatively, the tracking reliability R1 may be calculated using logical summation as shown in Equation (8).

$$R1 = (Ra < Ta) \vee (Rb < Tb) \vee (Rc < Tc) \vee (Rd < Td) \quad (8)$$

Where "$\vee$" is a symbol representing logical summation

If none of Ra<Ta, Rb<Tb, Rc<Tc, and Rd<Td are satisfied, R1=1 (high reliability), otherwise R1=0 (low reliability).

Next, an example of calculating the tracking reliability using feature amounts of feature points will be described. If the same feature point can be tracked correctly, the change in the feature amount of the feature point before and after the tracking is small. Therefore, the tracking reliability calculator 405 calculates the tracking reliability according to the amount of change in the feature amount before and after the tracking. The tracking reliability calculator 405 calculates feature amounts of a feature point before and after tracking of the feature point using Equation (3) or Equation (4) and calculates the amount of change in the feature amount by calculating the difference between the two feature amounts.

In FIG. 11B, the horizontal axis represents the amount of change in the feature amount and the vertical axis represents the tracking reliability R2. In the example shown in FIG. 11B, two threshold values T1 and T2 are provided. If the amount of change in the feature amount is equal to or smaller than the threshold value T1, it is assumed that the same feature point is tracked correctly, and the tracking reliability R2 is set to 1. If the amount of change in the feature amount is equal to is greater than the threshold value T12, it is assumed that different feature points are erroneously tracked, and the tracking reliability R2 is set to 0. In a section between the threshold values T1 and T2, the amount of change in the feature amount and the tracking reliability may be associated with each other nonlinearly. That is, when the amount of change in the feature amount is a second value smaller than a first value, a higher tracking reliability is calculated than when the amount of change in the feature amount is the first value. In this manner, the tracking reliabilities R1 and R2 can be calculated from correlation value information and feature point information, respectively. Any one of the tracking reliabilities R1 and R2 may be used as the final tracking reliability R and a combination thereof may also be used. The combination may use weighted summation or logic operation as described above with reference to Equations (6) to (8).

Description will now return to the description of FIG. 5. In step S505, the feature point tracker 210 determines whether or not the process has been completed up to the last frame. If the process has not been completed up to the last frame, the process returns to S502. Then, the feature point setter 402 sets coordinates of the end point of the motion vector detected in step S503 as those of a feature point to be tracked in the next frame. As a result, the coordinates of the end point of the motion vector indicate the movement destination of the feature point. Therefore, it is possible to track the feature point over a plurality of frames.

<Details of Process for Determining Feature Point Weight>

Figure 12A:
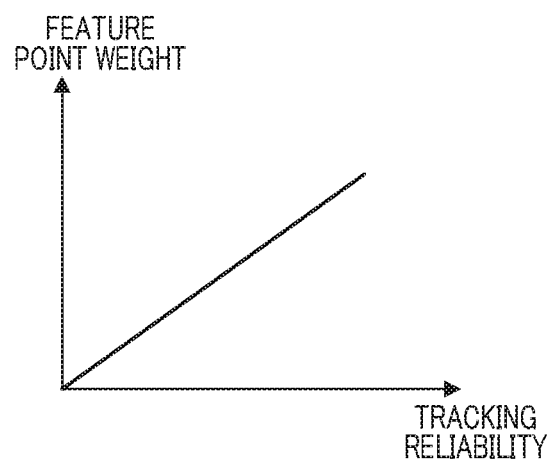
FIGS. 12A and 12B are diagrams illustrating examples of a process for determining a feature point weight.
Figure 12B:
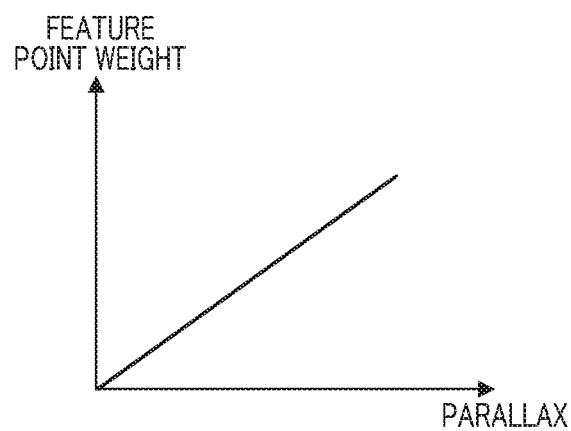

FIGS. 12A and 12B are diagrams illustrating examples of the process for determining a feature point weight in step S304 of FIG. 3. For example, the feature point weight controller 209 uses the tracking reliability obtained in step S302 of FIG. 3 and a parallax amount between frames (between captured images) to control the feature point weight. Specifically, the feature point weight controller 209 functions as a parallax amount calculator that calculates the amount of coordinate displacement between frames of a feature point belonging to the background region obtained in step S303 in FIG. 3 as the parallax amount.

FIG. 12A shows a relationship between the tracking reliability and the feature point weight. The higher the tracking reliability of a feature point used, the higher the accuracy in which three-dimensional coordinates of the feature point can be estimated. Therefore, the feature point weight controller 209 performs control such that the feature point weight increases as the tracking reliability increases. Specifically, the feature point weight when the tracking reliability is a second value greater than a first value is made greater than when the tracking reliability is the first value. FIG. 12B shows a relationship between the parallax amount and the feature point weight. The greater the parallax amount of a feature point used, the higher the accuracy in which three-dimensional coordinates of the feature point can be estimated. Therefore, the feature point weight controller 209 performs control such that the feature point weight increases as the parallax amount increases. Specifically, the feature point weight when the parallax amount is a second value greater than a first value is made greater than when the parallax amount is the first value.

<Details of Three-Dimensional Coordinate Estimation>

Figure 13:
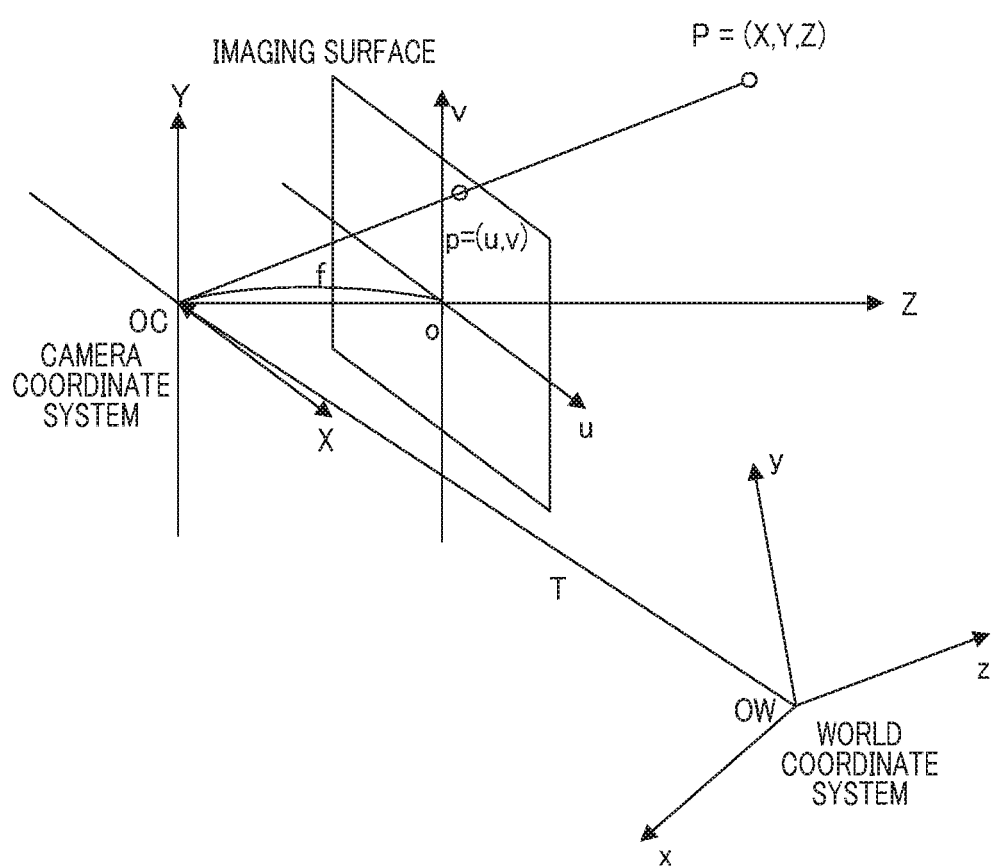
FIG. 13 is a diagram illustrating a process for estimating three-dimensional coordinates of feature points.
Figure 14:
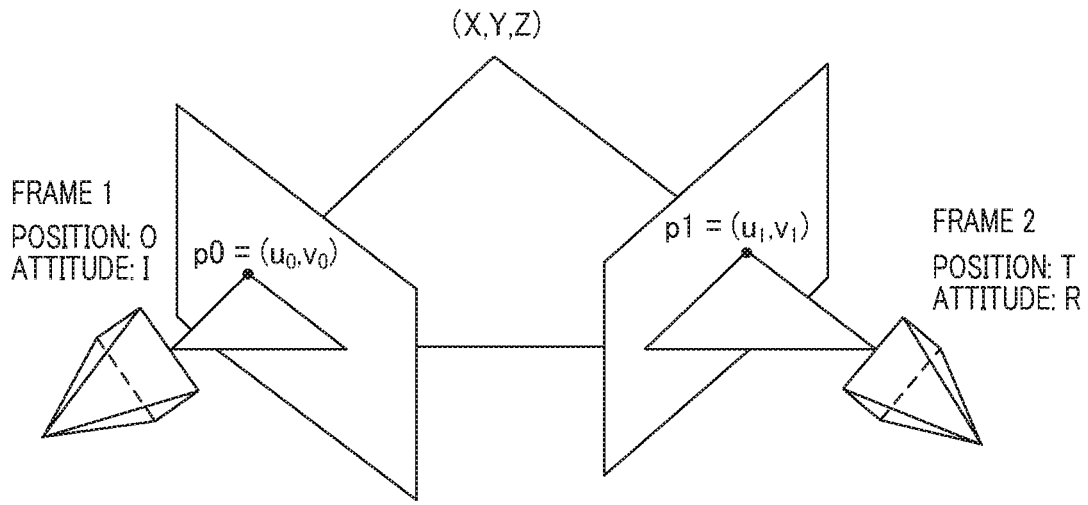
FIG. 14 is a diagram illustrating a process for estimating three-dimensional coordinates of feature points.

FIGS. 13 and 14 are diagrams illustrating a process for estimating three-dimensional coordinates of a feature point in step S310 of FIG. 3. FIG. 13 shows a perspective projection model representing a relationship between three-dimensional coordinates P=(X, Y, Z) of a feature point and two-dimensional coordinates p=(u, v) obtained by projecting the feature point onto a captured image. In the example shown in FIG. 13, a virtual imaging surface is set in front of the lens at a position away from the lens by a focal length f. "OW" represents the origin of a world coordinate system, "OC" represents the origin of a camera coordinate system (the center of the camera lens), and z axis represents the optical axis of the camera. "P" is expressed in the world coordinate system and p is expressed in the camera coordinate system.

In perspective projection transformation, the relationship between the three-dimensional coordinates "P" and the two-dimensional coordinates "p" is expressed by Equation (9).

$$\begin{bmatrix} u \\ v \\ 1 \end{bmatrix} = K[R|t]\begin{bmatrix} X \\ Y \\ Z \\ 1 \end{bmatrix}, \quad K = \begin{bmatrix} f & 0 & cx \\ 0 & f & cy \\ 0 & 0 & 1 \end{bmatrix}, \quad (9)$$

$$[R|t] = \begin{bmatrix} R_{11} & R_{12} & R_{13} & t_x \\ R_{21} & R_{22} & R_{23} & t_y \\ R_{31} & R_{32} & R_{33} & t_z \end{bmatrix}$$

Here, "K" is called an internal parameter matrix, which is a parameter specific to the camera. "K" consists of the principal point c=(cx, cy) and the focal length f in units of pixels. In this example, it is assumed that the principal point is the center of the image (0, 0), which is handled as cx=cy=0.

"R" and "t" are called external parameter matrices and represent the position attitude of the camera in the world coordinate system. "R" is a rotation matrix and "t" is a translation matrix. The elements of "R" are expressed by R11 to R33 and the elements of "t" are expressed by $t_x$ to $t_z$.

FIG. 14 shows a state in which three-dimensional coordinates P are observed from two different positions/attitudes of the camera. Let P=(X, Y, Z) be three-dimensional coordinates of an estimation target, O (origin) be the position of the camera in frame 1, I (unit matrix) be the attitude thereof, and p0=(u0, v0) be feature coordinates on a captured image at that time. Further, let T be the position of the camera in frame 2, R be the attitude thereof, and p1=(u1, v 1) be feature coordinates on the captured image.

From Equation (9), the relationship between the three-dimensional coordinates P and the two-dimensional coordinates p0 and p1 on the captured image is expressed by Equations (10) and (11).

$$u_0 = f\frac{X}{Z}, v_0 = f\frac{Y}{Z} \quad (10)$$

$$u_1 = f\frac{R_{11}X + R_{12}Y + R_{13}Z + t_x}{R_{31}X + R_{32}Y + R_{33}Z + t_z}, \quad (11)$$

$$v_1 = f\frac{R_{21}X + R_{22}Y + R_{23}Z + t_y}{R_{31}X + R_{32}Y + R_{33}Z + t_z}$$

Here, "f" is the focal length. "R" and "T" are the position attitude estimation value obtained in step S309 of FIG. 3. The feature point information of the background region obtained in step S304 of FIG. 3 may be used as the coordinate values of p0 and p1. Therefore, by solving the simultaneous Equations (10) and (11), it is possible to obtain unknowns X, Y, and Z, thus obtaining the three-dimensional coordinates. While the number of unknowns is three (X, Y, and Z), the number of simultaneous equations is 2n when the number of frames for tracking the feature point is n. Therefore, when the three-dimensional coordinates P are observed from only one frame, P cannot be uniquely determined since the number of unknowns is greater than the number of equations. On the other hand, with two or more frames, an excessive number of simultaneous equations (conditions) are obtained and therefore can be solved, for example, using a known least squares method.

<Correction of Position Attitude Estimation Value>

Figure 15:
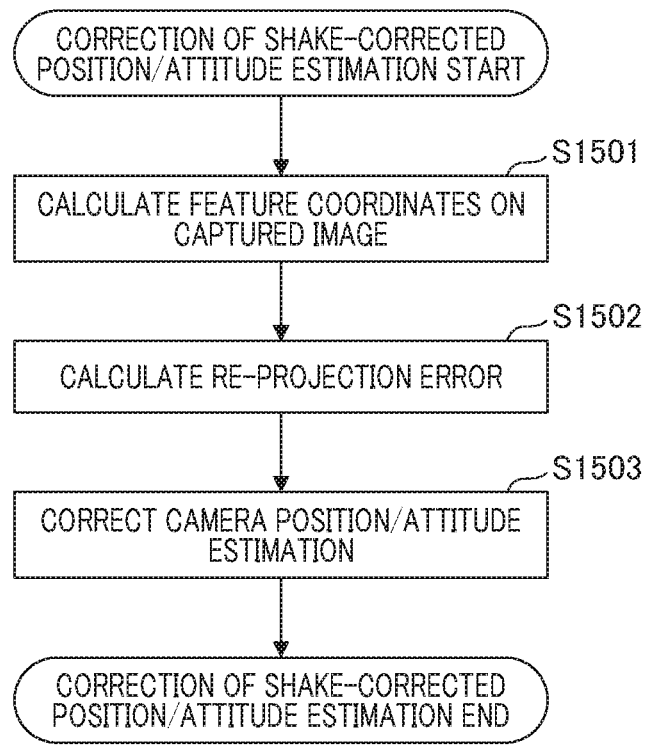
FIG. 15 is a flowchart illustrating an example of correction of a position attitude estimation value.

FIG. 15 is a flowchart illustrating an example of correction of a position attitude estimation value in step S311 in FIG. 3. In step S501, the position attitude estimator 207 converts the three-dimensional coordinates estimated in step S310 by projecting the three-dimensional coordinates onto two-dimensional coordinates on the captured image using Equation (9). Subsequently, in step S1502, the position attitude estimator 207 calculates a re-projection error which is an estimation error of three-dimensional coordinates of the feature point. The position attitude estimator 207 calculates the re-projection error on the basis of the feature point weight and the difference between the two-dimensional coordinates of the feature points obtained in step S1501 and actually tracked (observed) two-dimensional coordinates of the feature point. The actually observed two-dimensional coordinates of the feature point are obtained in the process of separating feature points in step S303 of FIG. 3.

The re-projection error E is expressed by Equation (12).

$$E = \sum_{i=0}^{n-1}\sum_{j=0}^{m-1} W_i|u_{ij} - \hat{u}_{ij}|^2, \quad W_i = \begin{bmatrix} w_{i0} & 0 & & 0 \\ 0 & w_{i1} & & 0 \\ & & w_{ij} & \\ 0 & 0 & & w_{im-1} \end{bmatrix} \quad (12)$$

Here, "i" represents the frame number. "j" represents the feature point number. When the number of frames is n and the number of feature points is m, "i" varies in a range of 0 to n−1 and "j" varies in a range of 0 to m−1, respectively. "Wi" is a matrix representing feature point weights in the i-th frame. An element of the i-th row and the j-th column of the matrix "Wi" is the weight wij of the j-th feature point in the i-th frame, which is obtained in step S304. As the feature point weight of a feature point increases, the influence of the feature point upon the re-projection error increases and the degree of contribution of the feature point to the correction of the position attitude estimation value in step S1503 which will be described later also increases.

Next, in step S1503, the position attitude estimator 207 corrects the shake-corrected position attitude estimation value such that the re-projection error calculated in step S1502 is minimized. The re-projection error is an error between the actually observed two-dimensional coordinates of the captured image and the two-dimensional coordinates obtained by projecting the three-dimensional coordinates onto the captured image. Therefore, if the three-dimensional coordinates and the tracked two-dimensional coordinates are correct, the coordinate error is caused by the error of position attitude estimation when the three-dimensional coordinates are projected onto the captured image. Therefore, the smaller the re-projection error, the closer the position attitude estimation value is to the true value. Thus, the correction of the position attitude estimation value is a problem of minimizing the re-projection error with the position attitude estimation value as a variable. The position attitude estimator 207 corrects the position attitude estimation value such that the re-projection error is minimized, for example, using a known weighted least squares method.

<Details of Target Position Calculation>

Figure 16:
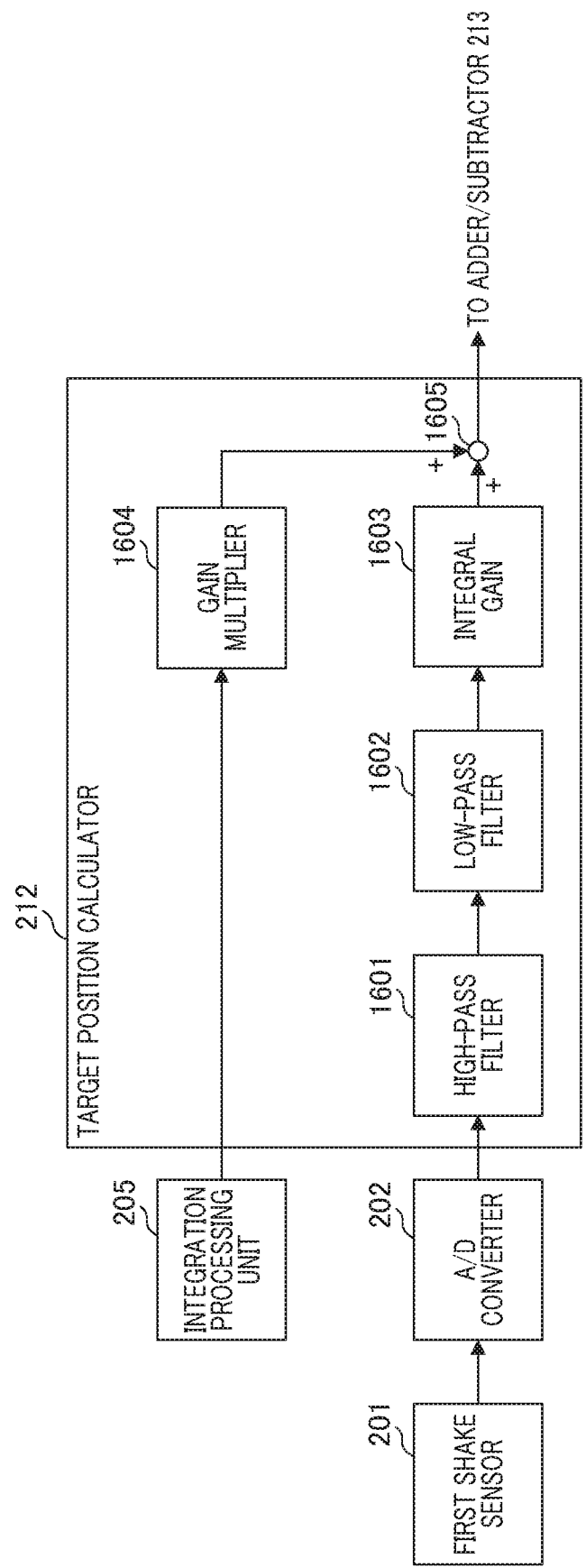
FIG. 16 is a diagram illustrating an exemplary configuration of a target position calculator.

FIG. 16 is a diagram showing an exemplary configuration of the target position calculator. The target position calculator 212 includes a high-pass filter 1601, a low-pass filter 1602, an integral gain unit 1603, a gain multiplier 1604, and an adder 1605. The high-pass filter 1601 removes a DC offset component of the first shake sensor 201. The low-pass filter 1602 performs a filtering process on a shake angular velocity signal output by the high-pass filter 1601. The integral gain unit 1603 integrates an output signal of the low-pass filter 1602 with an integral gain. Thereby, the shake angular velocity signal is converted into a shake angle signal. The gain multiplier 1604 multiplies an output of the integration processing unit 205 by a gain. The adder 1605 adds a feedback amount from the gain multiplier 1604 to the output of the integral gain unit 1603. As a result, a target position is calculated.

Figure 17:
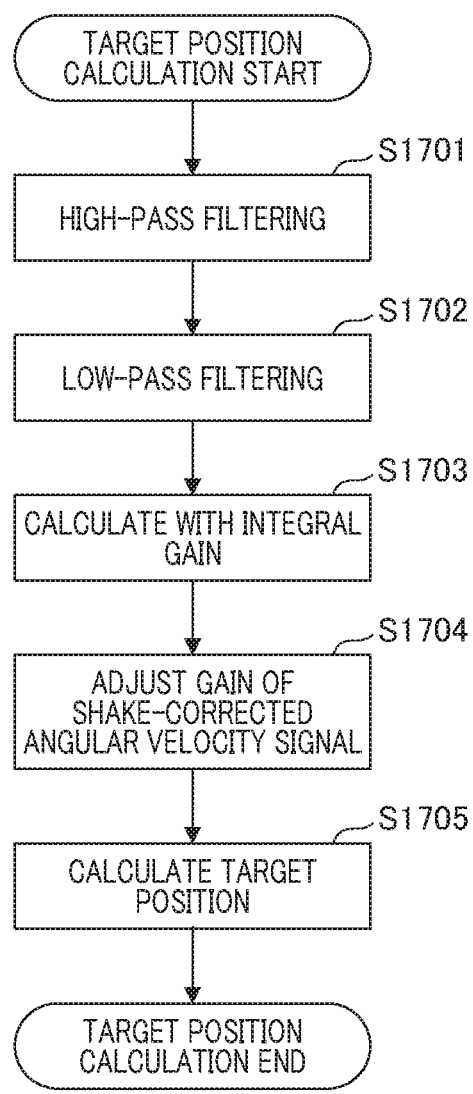
FIG. 17 is a flowchart illustrating an example of a process for calculating a target value.

FIG. 17 is a flowchart illustrating an example of a process for calculating a target value in step S312 of FIG. 3. In step S1701, the high-pass filter 1601 removes a DC offset component from the shake angular velocity signal of the imaging apparatus detected by the first shake sensor 201 in step S305 of FIG. 3. In step S1702, the low-pass filter 1602 performs a filtering process on the shake angular velocity signal from which the DC offset component has been removed in step S1701. In step S1703, the integral gain 1603 integrates the output of the low-pass filter with an integral gain, thus converting the shake angular velocity signal into a shake angle signal.

Next, in step S1704, the target position calculator 212 determines the gain of the gain multiplier 1604 according to the position attitude information (the reliability of the shake-corrected angle signal) output by the integration processing unit 205. Then, the gain multiplier 1604 multiplies the shake-corrected angle signal by the determined gain. As the reliability of the shake-corrected angle signal increases, the target position calculator 212 increases the gain in order to more positively reflect the shake-corrected angle signal in the target position.

Figure 18A:
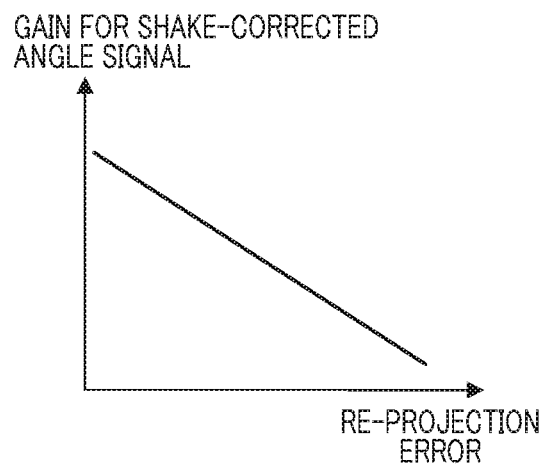
FIGS. 18A and 18B are diagrams illustrating an example of gain determination of a gain multiplier.
Figure 18B:
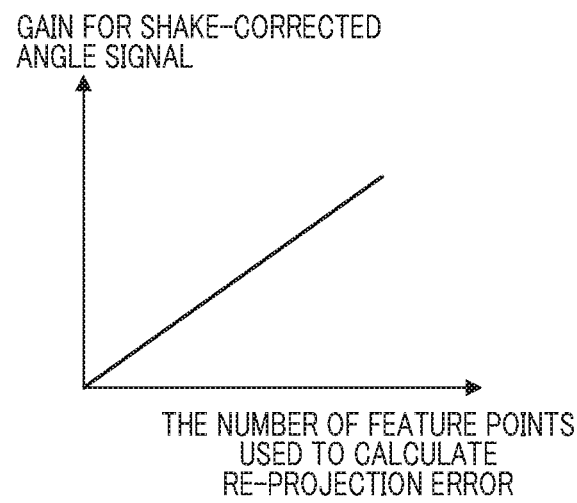

FIGS. 18A and 18B are diagrams illustrating an example of gain determination of the gain multiplier. The target position calculator 212 determines the gain on the basis of the re-projection error or the number of feature points used to calculate the re-projection error. Thereby, the target position calculator 212 controls the combination ratio of the shake information obtained by the first shake sensor 201 and the output of the integration processing unit 205, that is, the position attitude information of the imaging apparatus.

The shake-corrected angle signal is obtained by correcting the position attitude estimation value of the camera obtained through the shake sensor on the basis of the three-dimensional coordinates obtained from the captured image such that the re-projection error calculated by Equation (12) is minimized. That is, the smaller the re-projection error of Equation (12), the higher the reliability of the shake-corrected angle signal. Thus, as shown in FIG. 18A, the target position calculator 212 increases the gain as the re-projection error decreases. That is, the combination ratio of the position attitude information of the imaging apparatus when the re-projection error is a second value smaller than a first value is made higher than when the re-projection error is the first value.

In addition, as a greater number of feature points are used to calculate the re-projection error expressed by Equation (12), the motion of the entire captured image can be determined with higher accuracy and therefore the reliability of the shake-corrected angle signal is higher. Accordingly, as shown in FIG. 18A, the target position calculator 212 increases the gain as the number of feature points used to calculate the re-projection error increases. Accordingly, the combination ratio of the position attitude information of the imaging apparatus increases. That is, the combination ratio of the position attitude information of the imaging apparatus when the number of feature points used to calculate the re-projection error is a second value greater than a first value is higher than when the number of feature points used to calculate the re-projection error is the first value.

In step S1705, the target position calculator 212 sums the shake angle signal obtained in step S1703 and the shake-corrected angle signal multiplied by the gain, which is obtained in step S1704, through the adder 1605 to calculate the target position of the image blur correction lens 103.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-184615, filed Sep. 26, 2017 which is hereby incorporated by reference wherein in its entirety.

What is claimed is:

1. An image blur correction device comprising:
at least one processor and a memory holding a program which makes the processor function as:
a feature point tracking unit configured to track a feature point in a captured image and to calculate coordinate information of the feature point as feature point tracking information;
a three-dimensional coordinate estimating unit configured to estimate a positional relationship including a depth between a subject and an imaging apparatus as three-dimensional coordinates of the feature point on the basis of the feature point tracking information and position attitude information of the imaging apparatus calculated on the basis of shake information relating to shake of the imaging apparatus;
a control unit configured to control a degree of contribution of the feature point to the estimation of the three-dimensional coordinates;
a correcting unit configured to correct the position attitude information of the imaging apparatus according to a result of the estimation of the three-dimensional coordinates of the feature point; and
a target position calculating unit configured to calculate a target position of a shake corrector used to correct image blur caused by shake of the imaging apparatus based on the shake information and the position attitude information,
wherein the control unit controls the degree of contribution according to a reliability of the feature point tracking information or a parallax amount between captured images.

2. The image blur correction device according to claim 1, wherein the control unit makes the degree of contribution higher when the reliability of the feature point tracking information is a second value higher than a first value than when the reliability of the feature point tracking information is the first value.

3. The image blur correction device according to claim 1, wherein the control unit makes the degree of contribution higher when the parallax amount is a second value greater than a first value than when the parallax amount is the first value.

4. The image blur correction device according to claim 1, the program makes the processor function as:
- a vector calculating unit configured to calculate motion vector information on the basis of a signal relating to the captured image,
- wherein the reliability of the feature point tracking information is calculated on the basis of a result of correlation value calculation performed when calculating the motion vector information.

5. The image blur correction device according to claim 1, wherein the reliability of the feature point tracking information is calculated according to an amount of change in a feature amount of the feature point before and after the tracking.

6. The image blur correction device according to claim 5, wherein a higher tracking reliability is calculated when the amount of change in the feature amount of the feature point before and after the tracking is a second value smaller than a first value than when the amount of change is the first value.

7. The image blur correction device according to claim 1, wherein the correcting unit is configured to calculate an estimation error of the three-dimensional coordinates on the basis of the degree of contribution and a difference between coordinate information of the feature point obtained by projecting the estimated three-dimensional coordinates onto a captured image and tracked coordinate information of the feature point and to correct the position attitude information such that the estimation error is minimized.

8. The image blur correction device according to claim 7, wherein the target position calculating unit controls a combination ratio of the shake information and the position attitude information on the basis of the estimation error of the three-dimensional coordinates or the number of the feature points used to calculate the estimation error.

9. The image blur correction device according to claim 8, wherein the target position calculating unit makes the combination ratio of the position attitude information higher when the estimation error of the three-dimensional coordinates is a second value smaller than a first value than when the estimation error is the first value.

10. The image blur correction device according to claim 8, wherein the target position calculating unit makes the combination ratio of the position attitude information higher when the number of feature points used to calculate the estimation error is a second value greater than a first value than when the number of feature points is the first value.

11. A method for controlling an image blur correction device, the method comprising:
- tracking a feature point in a captured image and calculating coordinate information of the feature point as feature point tracking information;
- estimating a positional relationship including a depth between a subject and an imaging apparatus as three-dimensional coordinates of the feature point on the basis of the feature point tracking information and position attitude information of the imaging apparatus calculated on the basis of shake information relating to shake of the imaging apparatus;
- controlling a degree of contribution of the feature point to the estimation of the three-dimensional coordinates;
- correcting the position attitude information of the imaging apparatus according to a result of the estimation of the three-dimensional coordinates of the feature point;
- calculating a target position of a shake corrector used to correct image blur caused by shake of the imaging apparatus based on the shake information and the position attitude information; and
- wherein controlling the degree of contribution according to a reliability of the feature point tracking information or a parallax amount between captured images.

* * * * *